US012380602B2

(12) United States Patent
Zheng et al.

(10) Patent No.: US 12,380,602 B2
(45) Date of Patent: Aug. 5, 2025

(54) OPTICAL AXIS CALIBRATION METHOD AND APPARATUS OF OPTICAL AXIS DETECTION SYSTEM, TERMINAL, SYSTEM, AND MEDIUM

(71) Applicant: ORBBEC INC., Guangdong (CN)

(72) Inventors: Dejin Zheng, Shenzhen (CN); Yanxu Duan, Shenzhen (CN); Wanduo Wu, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 213 days.

(21) Appl. No.: 18/217,781

(22) Filed: Jul. 3, 2023

(65) Prior Publication Data
US 2023/0351635 A1 Nov. 2, 2023

Related U.S. Application Data

(63) Continuation of application No. PCT/CN2021/107951, filed on Jul. 22, 2021.

(30) Foreign Application Priority Data

Apr. 22, 2021 (CN) .......................... 202110435320.X

(51) Int. Cl.
*G06T 7/80* (2017.01)
*G06T 5/80* (2024.01)
(Continued)

(52) U.S. Cl.
CPC .................. *G06T 7/80* (2017.01); *G06T 5/80* (2024.01); *G06T 7/73* (2017.01); *H04N 17/002* (2013.01); *G06T 2207/10004* (2013.01)

(58) Field of Classification Search
CPC .... G06T 7/80; G06T 7/73; G06T 5/80; G06T 2207/10004; H04N 17/002
See application file for complete search history.

(56) References Cited

U.S. PATENT DOCUMENTS 10,740,917 B2 8/2020 Ge et al.
2019/0188874 A1 6/2019 Ge et al.
(Continued)

FOREIGN PATENT DOCUMENTS

CN 104754323 A 7/2015
CN 106768887 A 5/2017
(Continued)

OTHER PUBLICATIONS

PCT International Search Report and the Written Opinion mailed Jan. 20, 2022, issued in related International Application No. PCT/CN2021/107951, with partial English translation (11 pages).
(Continued)

*Primary Examiner* — Yassin Alata
(74) *Attorney, Agent, or Firm* — Sheppard Mullin Richter & Hampton LLP

(57) ABSTRACT

A method for calibrating an optical axis includes: acquiring a first speckle image and a second speckle image captured respectively before and after a speckle emission device is rotated; extracting at least two first speckle points in the first speckle image and second speckle points in the second speckle image corresponding to the at least two first speckle points, to obtain at least two line segments formed by lines connecting the first speckle points and the second speckle points corresponding to the first speckle points in the same image coordinate system; and calculating a perpendicular bisector of each of the line segments, and determining an optical axis reference point according to an intersection point of the perpendicular bisectors. The method provided in embodiments of this application can reduce the impact of a jig tolerance on the optical axis calibration, and improve the accuracy of the optical axis calibration.

18 Claims, 6 Drawing Sheets

(51) Int. Cl.
*G06T 7/73* (2017.01)
*H04N 17/00* (2006.01)

(56) References Cited

U.S. PATENT DOCUMENTS

| | | | |
|---|---|---|---|
| 2020/0242806 | A1 | 7/2020 | Mori |
| 2021/0007825 | A1 | 1/2021 | Sela et al. |

FOREIGN PATENT DOCUMENTS

| | | | |
|---|---|---|---|
| CN | 109297680 | A | 2/2019 |
| CN | 109978959 | A | 7/2019 |
| CN | 110049305 | A | 7/2019 |
| CN | 111106055 | A | 5/2020 |
| CN | 111243002 | A | 6/2020 |
| CN | 111487043 | A | 8/2020 |
| CN | 111896032 | A | 11/2020 |
| CN | 111929695 | A | 11/2020 |
| CN | 112053405 | A | 12/2020 |
| CN | 112184811 | A | 1/2021 |
| CN | 112556994 | A | 3/2021 |
| CN | 113124763 | A | 7/2021 |

OTHER PUBLICATIONS

First Search dated Oct. 28, 2021, issued in related Chinese Application No. 202110435320.X (2 pages).
First Office Action dated Nov. 5, 2021, issued in related Chinese Application No. 202110435320.X, with English translation (8 pages).
Supplementary Search dated Apr. 2, 2022, issued in related Chinese Application No. 202110435320.X (1 page).

OPTICAL AXIS CALIBRATION METHOD AND APPARATUS OF OPTICAL AXIS DETECTION SYSTEM, TERMINAL, SYSTEM, AND MEDIUM

CROSS-REFERENCE TO RELATED APPLICATIONS

This application is a Continuation Applications of International Patent Application No. PCT/CN2021/107951 filed with the China National Intellectual Property Administration (CNIPA) on Jul. 22, 2021, which is based on and claims priority to and benefits of Chinese Patent Application No. 202110435320.X, filed on Apr. 22, 2021. The entire content of all of the above-referenced applications is incorporated herein by reference.

TECHNICAL FIELD

This application relates to the field of optics, and in particular, to an optical axis calibration method and apparatus of an optical axis detection system, a terminal, a system, and a medium.

BACKGROUND

In 3D depth sensors, such as monocular or active binocular based on the triangulation principle, indirect time of flight (Indirect TOF or iTOF) and direct time of flight (Direct TOF or dTOF), speckles projected by a speckle emission device (TX module for short) are generally captured by a receiving module (RX module for short) to acquire depth information. To ensure the reliability of the depth information, an included angle between an optical axis of the speckle emission device and a reference plane needs to be controlled. Therefore, the optical axis of the speckle emission device needs to be detected to determine a falling point of the optical axis on a projection screen to calibrate the optical axis. An angular relationship between the reference plane and the optical axis is further determined based on the optical axis, to ensure the reliability of the depth information.

However, the existing optical axis calibration method has high requirements for a jig in contact with the reference plane in an optical axis detection device. Considering a structural tolerance and an assembly tolerance of the jig, the obtained optical axis has large errors and a low accuracy.

SUMMARY

Embodiments of this application provide an optical axis calibration method and an apparatus of an optical axis detection system, a terminal, a system, and a medium, which can reduce the impact of a jig tolerance on the optical axis calibration, and improve the accuracy of the optical axis calibration.

A first aspect of the embodiments of this application provides a method for calibrating an optical axis, including:
acquiring a first speckle image and a second speckle image, where the first speckle image and the second speckle image are obtained by capturing a speckle pattern projected on a projection screen by a speckle emission device, the first speckle image is captured before the speckle emission device is rotated on a reference plane, and the second speckle image is captured after the speckle emission device is rotated on the reference plane;
extracting at least two first speckle points in the first speckle image and second speckle points in the second speckle image corresponding to the at least two first speckle points, to obtain at least two line segments connecting the at least two first speckle points and the second speckle points corresponding to the at least two first speckle points in a same image coordinate system; and
calculating a perpendicular bisector of each of the at least two line segments, and determining an optical axis reference point according to an intersection point of the perpendicular bisectors, where the optical axis reference point is a falling point of an optical axis of the speckle emission device on the projection screen.

A second aspect of the embodiments of this application provides an optical axis calibration apparatus, including:
an acquisition unit, configured to acquire a first speckle image and a second speckle image, where the first speckle image and the second speckle image are obtained by capturing a speckle pattern projected on a projection screen by a speckle emission device, the first speckle image is captured before the speckle emission device is rotated on a reference plane, and the second speckle image is captured after the speckle emission device is rotated on the reference plane;
an extraction unit, configured to extract at least two first speckle points in the first speckle image and second speckle points in the second speckle image corresponding to the at least two first speckle points, to obtain at least two line segments connecting the at least two first speckle points and the second speckle points corresponding to the at least two first speckle points in a same image coordinate system; and
a determining unit, configured to calculate a perpendicular bisector of each of the at least two line segments, and determine an optical axis reference point according to an intersection point of the perpendicular bisectors, where the optical axis reference point is a falling point of an optical axis of the speckle emission device on the projection screen.

A third aspect of the embodiments of this application provides an optical axis detection system, including a speckle emission device, a projection screen, a camera, and the optical axis calibration apparatus provided by the second aspect of the embodiments of this application, where
the speckle emission device is configured to project a speckle pattern on the projection screen;
the camera is configured to capture a first speckle image and a second speckle image, where the first speckle image and the second speckle image are obtained by capturing the speckle pattern projected on the projection screen by the speckle emission device, the first speckle image is captured before the speckle emission device is rotated on a reference plane, and the second speckle image is captured after the speckle emission device is rotated on the reference plane; and
the optical axis calibration apparatus is configured to acquire the first speckle image and the second speckle image, extract at least two first speckle points in the first speckle image and second speckle points in the second speckle image corresponding to the at least two first speckle points, to obtain at least two line segments formed by lines connecting the at least two first speckle points and the second speckle points corresponding to the at least two first speckle points in a same image coordinate system, calculate a perpendicular bisector of each of the at least two line segments, and determine an optical axis reference point according to an intersection point of the perpendicular bisectors, where the optical axis reference point is a falling point of an optical axis of the speckle emission device on the projection screen.

A fourth aspect of the embodiments of this application provides a terminal, including a memory, a processor, and a computer program stored in the memory and executable on the processor, where the processor implements the steps of the foregoing method when executing the computer program.

A fifth aspect of the embodiments of this application provides a non-statutory computer-readable storage medium, storing a computer program, where the computer program, when executed by a processor, implements the steps of the foregoing method.

A sixth aspect of the embodiments of this application provides a computer program product, where the computer program product, when run on a terminal, causes the terminal to perform the steps of the method.

In the implementations of this application, the first speckle image and the second speckle image that is obtained after the speckle emission device is rotated on the reference plane around the optical axis by a preset angle are acquired, the perpendicular bisector of each of the line segments is calculated based on the matching first speckle points and second speckle points in the images, and the optical axis reference point is determined according to the intersection point of the perpendicular bisectors. Therefore, no specific angle value of the rotation of the speckle emission device is used for the calculation of the optical axis reference point of the optical axis detection system. In other words, the optical axis calibration can be completed by capturing the second speckle image after rotating the speckle emission device by any degree, and analyzing the first speckle image and the second speckle image respectively obtained before and after the rotation. Therefore, the impact of the jig tolerance on the rotation degree and the impact on the optical axis calibration can be reduced, and the accuracy of the optical axis calibration can be improved. In addition, machining accuracy requirements for positions of the jig other than the reference plane and accuracy requirements for the rotation angle of the rotation module are also reduced, which indirectly reduces design and machining requirements for the product structure and facilitates applications in modules or systems with different structures.

BRIEF DESCRIPTION OF THE DRAWINGS

To describe the technical solutions of the embodiments of this application more clearly, the following briefly introduces the accompanying drawings required for describing the embodiments or the related art. Apparently, the accompanying drawings in the following description show only some embodiments of this application, and a person of ordinary skill in the art may still derive other drawings according to the accompanying drawings without creative efforts.

DETAILED DESCRIPTION

To make the objectives, technical solutions, and advantages of this application clearer and more understandable, this application is further described in detail below with reference to the accompanying drawings and the embodiments. It is to be understood that the embodiments described herein are merely used for explaining this application but are not to limit this application. All other embodiments obtained by a person skilled in the art based on the embodiments of this application without creative efforts shall fall within the protection scope of this application.

In 3D depth sensors such as monocular or active binocular based on the triangulation principle, indirect time of flight, and direct time of flight, speckles projected by a speckle emission device are generally captured by a receiving module (e.g., a camera) to acquire depth information. A degree of an included angle between the speckle emission device and the receiving module affects whether a speckle field of the speckle emission device can cover a complete field of view (FOV) of the receiving module. To ensure the reliability of the depth information, an included angle between an optical axis of the speckle emission device and a reference plane needs to be controlled. The reference plane may refer to a substrate plane of a bottom of the speckle emission device, or may refer to a light-emitting outer surface of a structure of the speckle emission device.

Because a light source in the speckle emission device is fixed on a substrate by glue or the like, and the light source may not be strictly parallel to a projection screen due to the process, an optical axis of a beam emitted by the light source may not be perpendicular to the projection screen, a certain included angle exists between the optical axis of the beam emitted by the light source and the projection screen, and different projection modules have different included angles. Therefore, a falling point of the optical axis on the projection screen needs to be determined, to calibrate the optical axis. An angular relationship between the reference plane and the optical axis is further determined based on the optical axis, to ensure the reliability of the depth information.

Figure 1:
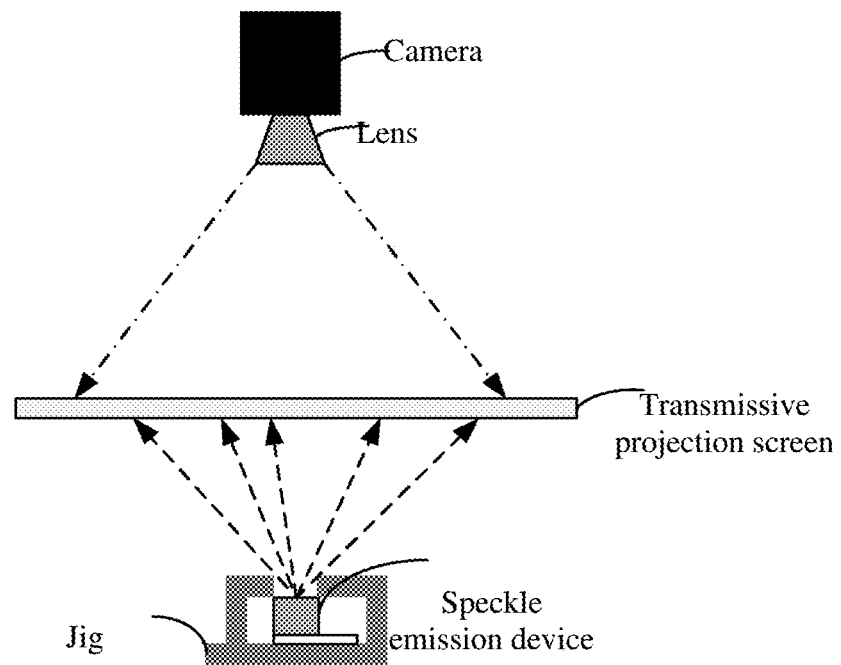
FIG. 1 is a schematic structural diagram of an optical axis detection device, according to an embodiment of this application.

At present, a solution of an optical axis detection device of a speckle projection module is shown in FIG. 1. A speckle emission device is arranged in a jig of the optical axis detection device, and speckles emitted by the speckle emission device are projected to the projection screen in the middle. Then a speckle image is acquired by photographing the projection screen through a camera to detect the optical axis. The camera may be an ordinary infrared camera, or an image sensor in the receiving module forming the depth sensor with the speckle emission device.

The optical axis detection device usually has a manufacturing tolerance and an assembly tolerance. Therefore, it is difficult to ensure that a bottom plane of the jig (that is, a plane in contact with the substrate of the speckle emission device) is strictly parallel to a plane of the projection screen. A speckle image cannot be used to calibrate a coordinate point position of the optical axis in an image coordinate system, and an included angle between the jig and a projection plane also causes errors of the detection device.

Figure 2:
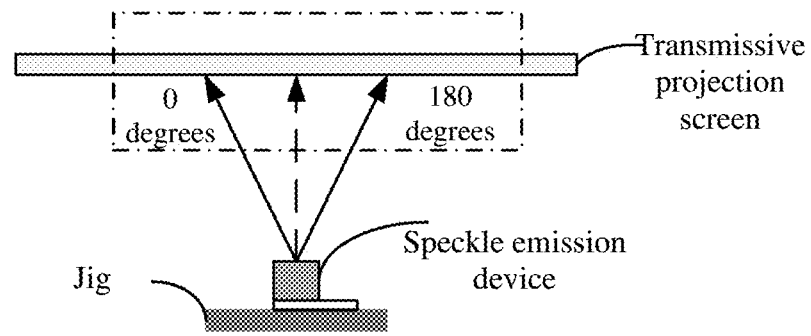
FIG. 2 is a schematic diagram of an existing optical axis detection technology.
Figure 3:
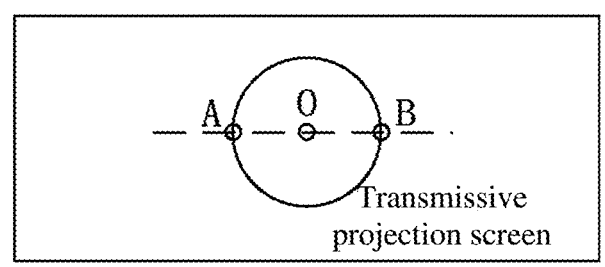
FIG. 3 is a schematic diagram of speckles in a projection screen using an existing optical axis detection technology.

FIG. 2 is a schematic diagram of an existing optical axis detection technology of an optical axis detection system, and FIG. 3 is a schematic diagram of speckles in a projection screen using an existing optical axis detection technology. By designing the jig, a center position of a designed optical axis of the speckle emission device is kept unchanged, and the speckle emission device is rotated by 180 degrees. The camera takes a speckle image, a speckle center point of the speckle emission device is found by image feature matching, and image coordinates A $(X_1, Y_1)$ of the point are saved. Then the speckle emission device is rotated back to 0 degrees, a speckle image is taken, and as above, image coordinates B $(X_2, Y_2)$ of a center point of the speckle field are found. In this case, coordinates of a reference optical axis point obtained by the optical axis detection device are $$O\left(\frac{X_1 + X_2}{2}, \frac{Y_1 + Y_2}{2}\right),$$

that is, coordinates of the falling point of the optical axis in the projection screen are $$O\left(\frac{X_1 + X_2}{2}, \frac{Y_1 + Y_2}{2}\right).$$

In a subsequent calibration process, the optical axis of each speckle emission device is detected through an included angle between the speckle center point and the reference optical axis point.

To calibrate a center position of the reference optical axis of the optical axis detection device, centers of speckle images projected by the speckle emission device at positions of 0 degrees and 180 degrees respectively need to be detected, and the positions of 0 degrees and 180 degrees are determined by machining the accuracy of the jig. Considering a structural tolerance and an assembly tolerance of the speckle emission device, the jig cannot strictly fix the position of the speckle emission device. In other words, in actual applications, it is difficult to ensure that the center position of the speckles of the speckle emission device can rotate around the reference optical axis by 180 degrees. A prerequisite of the existing method is that the 180 degrees needs to be accurate, and an angular error directly causes a position error of the reference optical axis point. In addition, it is difficult to use the method in a special module structure.

Based on this, this application provides an optical axis calibration method, which can determine the position of the reference optical axis without accurate rotation degrees, and can reduce the impact of a jig tolerance on the optical axis calibration. The method is applicable to modules or systems with different structures.

To describe technical solutions in this application, the following will be described by using the embodiments.

Figure 4:
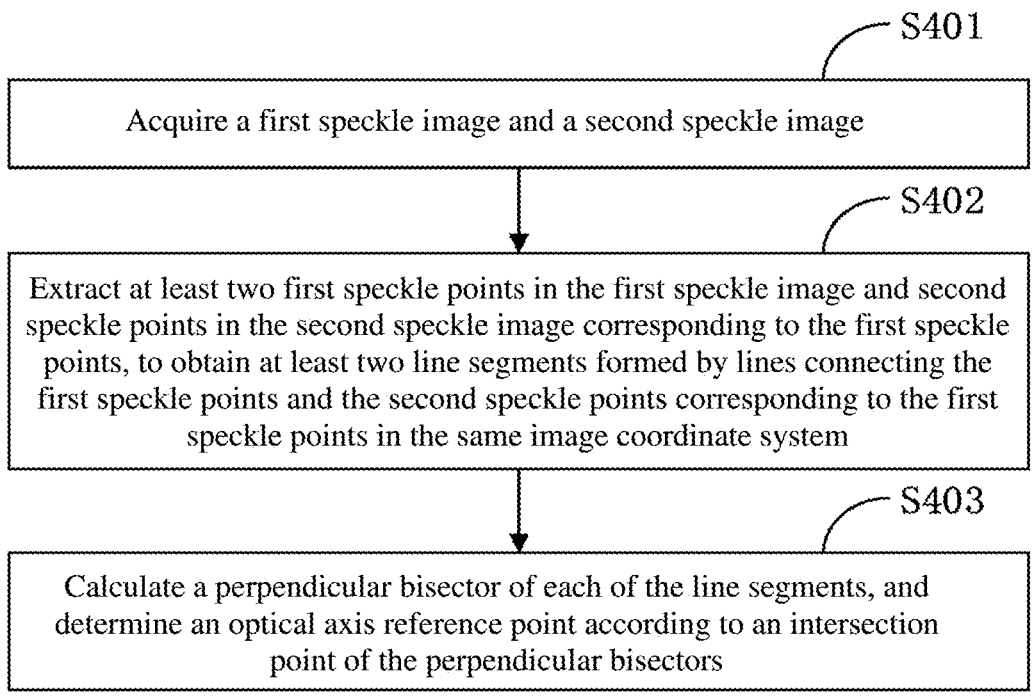
FIG. 4 is a flowchart of an implementation of a method for calibrating an optical axis of an optical axis detection system, according to an embodiment of this application.

FIG. 4 is a flowchart of an implementation of an optical axis calibration method of an optical axis detection system, according to an embodiment of this application. The method may be applied to a terminal, and may be applied to a situation in which the accuracy of an optical axis reference point needs to be improved to obtain an accurate optical axis.

The terminal may be the receiving module forming the depth sensor with the speckle emission device, or may be a terminal connected to the above optical axis detection device, such as a computer or a server.

The optical axis calibration method may include the following step S401 to step S403.

Step S401: Acquire a first speckle image and a second speckle image.

In this implementation of this application, the first speckle image and the second speckle image are images obtained by capturing a speckle pattern projected on a projection screen by a speckle emission device. The first speckle image is an image captured before the speckle emission device is rotated on a reference plane, and the second speckle image is an image captured after the speckle emission device is rotated on the reference plane.

In this implementation of this application, the speckle emission device projects a speckle pattern beam to the projection screen, and the first speckle image is obtained by the camera capturing the speckle pattern in the projection screen. Then, after the speckle emission device is rotated on the reference plane around the optical axis by a preset degree, the speckle emission device is controlled to project a speckle pattern beam to the projection screen. In this case, the second speckle image can be obtained by the camera capturing the speckle pattern in the projection screen. Positions of speckles in the second speckle image may be different from positions of speckles in the first speckle image. When a shape of the speckle emission device is regular, the rotation operation may be rotation around a center of the speckle emission device.

The preset degree can be adjusted according to actual situations, and the degree can be designed according to the module structure and the operation convenience of the detection device. To make the first speckle image different from the second speckle image, the preset degree may be any degree other than 0 degrees, 360 degrees, and an integer multiple of 360 degrees.

In some implementations of this application, the rotation operation may be implemented by a jig carrying a rotation module on the mold through the rotation module, or may be implemented by changing the jig. That is, after the first speckle image is acquired, the jig is changed, and the speckle emission device is rotated by an outside rotation module, so that the speckle emission device fits the jig, and captures the second speckle image.

For ease of calculation of the optical axis reference point, in some implementations of this application, the first speckle image and the second speckle image may be images obtained by the camera capturing the speckle pattern in the projection screen at the same position. For example, the first speckle image and the second speckle image may be respectively captured by the camera shown in FIG. 1 before and after the speckle emission device is rotated. It should be noted that, FIG. 1 is only for description, and the camera used in this application may be selected according to an optical FOV. A capture FOV of the camera used in this application may be slightly greater than a projection FOV of the projection module.

In some other implementations of this application, the first speckle image and the second speckle image may be images captured by the camera at different positions. After the first speckle image and the second speckle image are acquired, the terminal may perform coordinate calculations on the speckle points in the first speckle image and the speckle points in the second speckle image in the same image coordinate system.

Step S402: Extract at least two first speckle points in the first speckle image and second speckle points in the second speckle image corresponding to the first speckle points, to obtain at least two line segments connecting the first speckle points and the second speckle points corresponding to the first speckle points in the same image coordinate system.

The first speckle point may be any speckle point in the first speckle image. In an implementation of this application, at least two first speckle points need to be screened from the first speckle image. The second speckle points are speckle points in the second speckle image respectively matching the first speckle points. In other words, the second speckle point is a speckle point in the second speckle image corresponding to the first speckle point in the first speckle image after the rotation.

The terminal may select at least two first speckle points from the first speckle image, and perform feature point matching on the first speckle image and the second speckle image, to obtain the second speckle points in the second speckle image respectively matching the first speckle points.

A feature point matching algorithm may be selected according to actual situations. For example, the feature point matching algorithm such as scale-invariant feature transform (SIFT) or Speeded Up Robust Features (SURF) may be used.

In this implementation of this application, after the at least two first speckle points of the first speckle image and the second speckle points in the second speckle image respectively matching the first speckle points are acquired, at least two line segments formed by lines connecting the first speckle points and the second speckle points corresponding to the first speckle points can be obtained according to the positions of the first speckle points and the positions of the second speckle points corresponding to the first speckle points in the same image coordinate system.

A preset image coordinate system may be selected according to actual situations. For example, when the first speckle image and the second speckle image are the images respectively captured by the camera before and after the speckle emission device is rotated, the preset image coordinate system may be an image coordinate system corresponding to the camera shown in FIG. 1.

Step S403: Calculate a perpendicular bisector of each of the line segments, and determine an optical axis reference point according to an intersection point of the perpendicular bisectors.

In this implementation of this application, the perpendicular bisector of each of the line segments formed by matching speckle points is respectively calculated in the preset image coordinate system. The optical axis reference point can be determined based on the intersection point of the perpendicular bisectors, and the optical axis reference point is a falling point of an optical axis of the speckle emission device in the projection screen.

Figure 5:
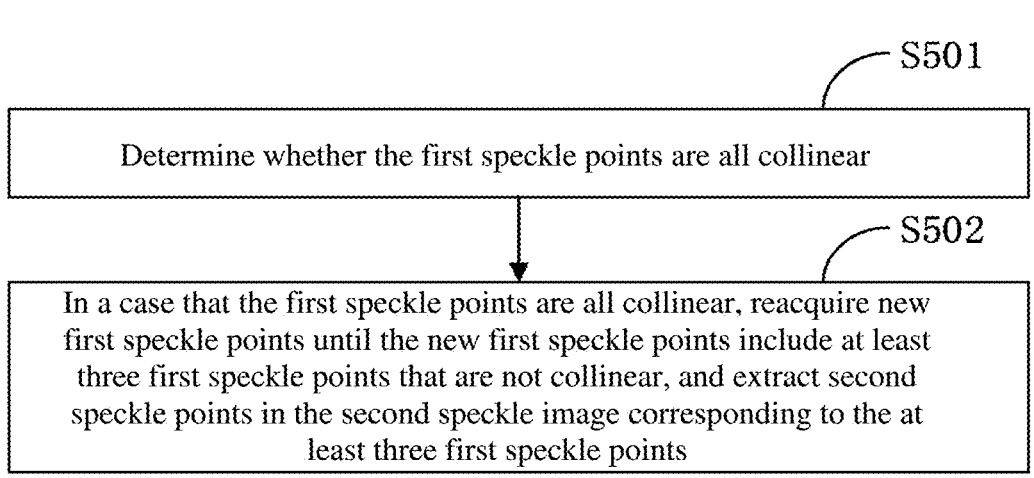
FIG. 5 is a flowchart of an implementation of acquiring second speckle points, according to an embodiment of this application.

In some implementations of this application, when a number of the first speckle points is greater than or equal to three, as shown in FIG. 5, the acquiring the second speckle points may include the following step S501 to step S502.

Step S501: Determine whether the first speckle points are all collinear.

Step S502: When the first speckle points are all collinear, reacquire new first speckle points until the new first speckle points include at least three first speckle points that are not collinear, and extract second speckle points in the second speckle image corresponding to the at least three first speckle points.

In other words, after the first speckle points are acquired, whether the first speckle points are all collinear may be determined first. When the first speckle points are all collinear, the second speckle points in the second speckle image respectively matching the first speckle points are also collinear. In this case, the calculated perpendicular bisector of each of the line segments is the same line without an intersection point, and the specific position of the optical axis reference point cannot be determined.

Figure 6:
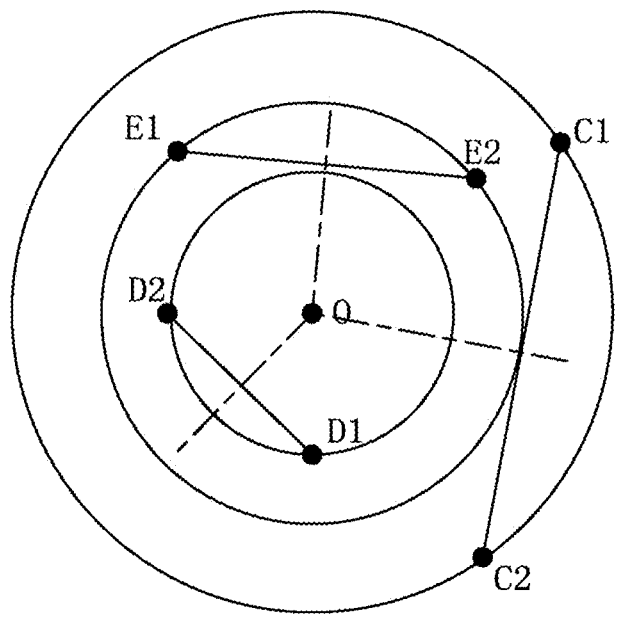
FIG. 6 is a schematic diagram of determining an intersection point of perpendicular bisectors based on three first speckle points, according to an embodiment of this application.

Therefore, when the first speckle points are all collinear, the first speckle points are reacquired. In some implementations of this application, any one or more first speckle points may be re-selected, or new first speckle points may be added based on the original first speckle points, until the first speckle points include at least three first speckle points that are not collinear, and the second speckle points in the second speckle image respectively matching the at least three first speckle points are acquired FIG. 6 is used as an example for description. Image coordinates of the three first speckle points in the first speckle image are C1 ($X_3$, $Y_3$), D1 ($X_4$, $Y_4$), and E1 ($X_5$, $Y_5$), respectively in the preset image coordinate system. Correspondingly, image coordinates of the second speckle points respectively matching the three first speckle points are C2 ($X_{31}$, $Y_{31}$), D2 ($X_{41}$, $Y_{41}$), and E2 ($X_{51}$, $Y_{51}$), respectively in the preset image coordinate system.

Perpendicular bisector equations of line segments M1N1, M2N2, and M3N3 are found respectively, and the three perpendicular bisector equations are solved jointly:

$$\begin{cases} \left(\frac{Y_{31} - X_3}{Y_3 - Y_{31}}\right) \times \left(X - \frac{Y_{31} + X_3}{2}\right) + \frac{Y_{31} + Y_3}{2} = Y \\ \left(\frac{X_{41} - X_4}{Y_4 - Y_{41}}\right) \times \left(X - \frac{X_{41} + X_4}{2}\right) + \frac{Y_{41} + Y_4}{2} = Y \\ \left(\frac{X_{51} - X_5}{Y_5 - Y_{51}}\right) \times \left(X - \frac{X_{51} + X_5}{2}\right) + \frac{Y_{51} + Y_5}{2} = Y \end{cases}$$

at least one intersection point (X, Y) may be obtained by solving the equations two by two.

The above is described using three first speckle points as an example, a calculation manner of selecting other numbers of the first speckle points is the same, and details are not repeated in this application.

It should be noted that, when the first speckle points include at least three first speckle points that are not collinear, there may be a plurality of intersection points of the calculated perpendicular bisectors. Three first speckle points are used as an example for description. Three different perpendicular bisectors can be calculated based on the three first speckle points and second speckle points respectively corresponding to the three first speckle points. Every two of the three different perpendicular bisectors can respectively intersect at a different intersection point, that is, three intersection points are obtained.

In this case, the terminal can determine the optical axis reference point according to the intersection points of the plurality of perpendicular bisectors.

In some implementations of this application, the terminal can calculate mean value coordinates of the intersection points of the perpendicular bisectors, and use a point at which the mean value coordinates are located as the optical axis reference point.

In some other implementations of this application, the terminal can further fit the intersection points of the plurality of perpendicular bisectors into a straight line by using a least square method, and solve for the optical axis reference point according to the fitted straight line. For example, a mean value of horizontal coordinates of the intersection points of the plurality of perpendicular bisectors may be used as a horizontal coordinate of the optical axis reference point, and the horizontal coordinate of the optical axis reference point is substituted into an equation of the fitted straight line, to solve for a vertical coordinate of the optical axis reference point.

It should be noted that, other statistical evaluation methods, such as weighted mean method, are also applicable to this application, which is not limited in this application.

In this implementation of this application, the first speckle points including at least three speckle points that are not collinear are selected and the second speckle points respectively matching the at least three first speckle points are acquired, to calculate the intersection points of the plurality of perpendicular bisectors, and the optical axis reference point is determined according to the intersection points of the plurality of perpendicular bisectors, to avoid more random errors with the intersection points of the perpendicular bisectors as the optical axis. As the number of the selected first speckle points increases, errors of the optical axis calibration position can further be reduced.

Figure 7:
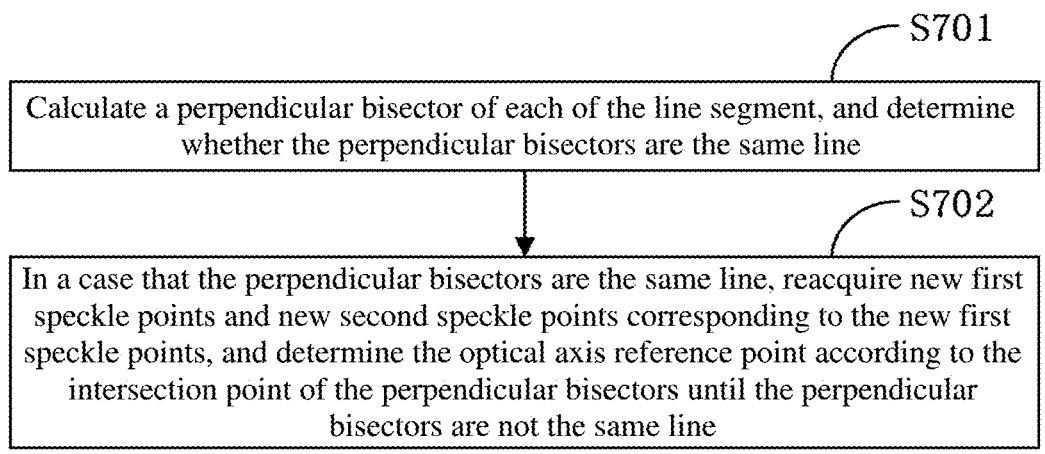
FIG. 7 is a flowchart of an implementation of step S403 when a number of first speckle points is two, according to an embodiment of this application.

In some other implementations of this application, the number of the first speckle points may also be equal to two. In this case, to ensure the reliability of the optical axis reference point, as shown in FIG. 7, the above step S403 may further include the following step S701 to step S702.

Step S701: Calculate the perpendicular bisector of each of the line segments, and determine whether the perpendicular bisectors are the same line.

Step S702: When the perpendicular bisectors are the same line, reacquire new first speckle points and new second speckle points corresponding to the new first speckle points, and determine the optical axis reference point according to the intersection point of the perpendicular bisectors until the perpendicular bisectors are not the same line.

Figure 8:
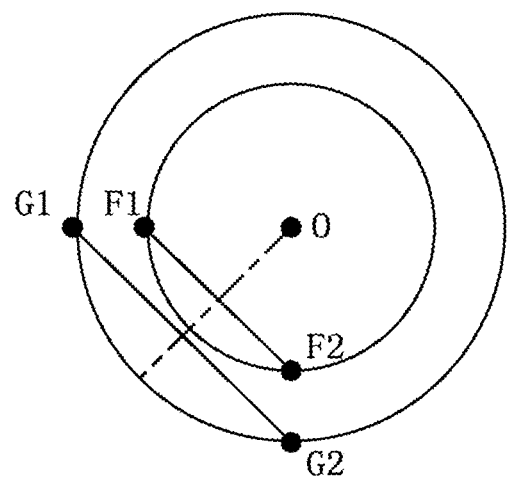
FIG. 8 is a schematic diagram of perpendicular bisectors that are the same straight line based on two first speckle points, according to an embodiment of this application.
Figure 9:
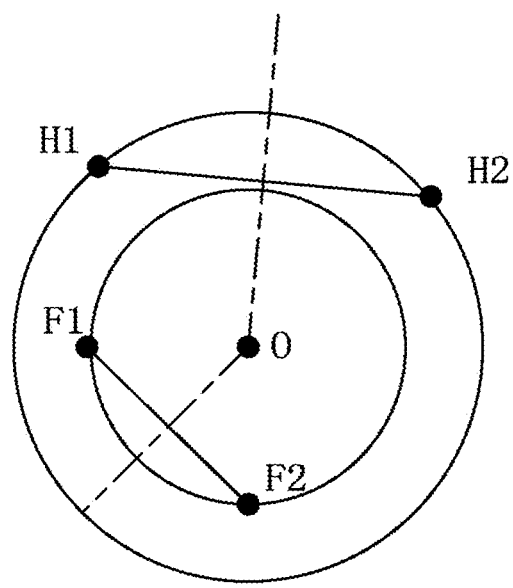
FIG. 9 is a schematic diagram of determining an intersection point of perpendicular bisectors based on two first speckle points, according to an embodiment of this application.

As shown in FIG. 8, when the number of the first speckle points is equal to two, based on the first speckle points and the second speckle points respectively matching the first speckle points, the calculated perpendicular bisectors of the two line segments may be the same line. In this case, the specific position of the optical axis reference point cannot be determined. Therefore, the terminal needs to determine whether the perpendicular bisectors are the same line. When the perpendicular bisectors are the same line, new first speckle points and new second speckle points respectively matching the new first speckle points are reacquired, and the perpendicular bisectors of the line segments formed by the new first speckle points and the corresponding new second speckle points are recalculated, until the perpendicular bisectors are not the same line. As shown in FIG. 9, the optical axis reference point is determined according to the intersection point of the perpendicular bisectors. When the number of the selected first speckle points is equal to two, the intersection point of the solved perpendicular bisectors is unique. Therefore, the intersection point of the perpendicular bisectors can be used as the optical axis reference point.

In the implementations of this application, the first speckle image and the second speckle image that is obtained after the speckle emission device is rotated on the reference plane around the optical axis by a preset angle are acquired, the perpendicular bisector of each of the line segments is calculated based on the matching first speckle points and second speckle points in the images, and the optical axis reference point is determined according to the intersection point of the perpendicular bisectors. Therefore, an angle value of the rotation of the speckle emission device does not need to be specified during calculation of the optical axis reference point of the optical axis detection system. In other words, the optical axis calibration can be completed by capturing the second speckle image after rotating the speckle emission device by any degree, and analyzing the first speckle image and the second speckle image respectively obtained before and after the rotation. Therefore, the impact of the jig tolerance on the rotation degree and the impact on the optical axis calibration can be reduced, and the accuracy of the optical axis calibration can be improved. In addition, machining accuracy requirements for positions of the jig other than the reference plane and accuracy requirements for the rotation angle of the rotation module are also reduced, which indirectly reduces design and machining requirements for the product structure and facilitates application in modules or systems with different structures.

In this implementation of this application, after the optical axis reference point is obtained, the method may further include: acquiring a speckle center point of the first speckle image, and determining an included angle between the optical axis of the speckle emission device and the reference plane based on the speckle center point and the optical axis reference point.

Figure 10:
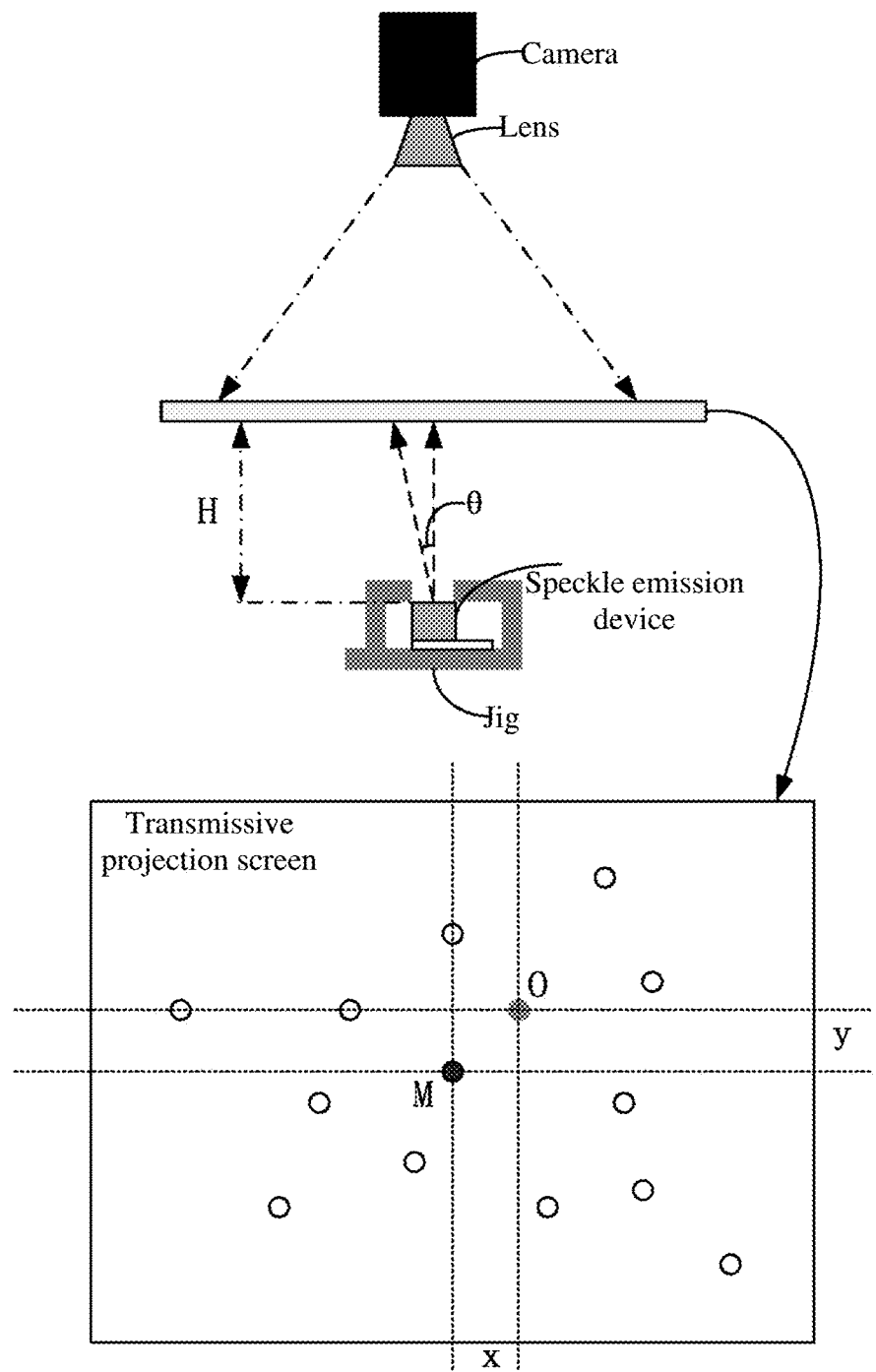
FIG. 10 is a schematic diagram of determining an included angle between an optical axis of a speckle emission device and a reference plane, according to an embodiment of this application.

Using FIG. 10 as an example, according to the speckle center point M and the optical axis reference point O, the included angle θ between the optical axis of the speckle emission device and a light ray corresponding to the speckle center can be calculated. An included angle $\theta_x=\arctan(x/H)$ in an x direction, an included angle $\theta_y=\arctan(y/H)$ in a y direction, and the included angle between the optical axis of the speckle emission device and the reference plane can be calculated based on the included angle θ. x is a distance between the speckle center point M and the optical axis reference point O in the x direction in the preset image coordinate system, and y is a distance between the speckle center point M and the optical axis reference point O in the y direction in the preset coordinate system.

It should be noted that, for ease of description, the foregoing method embodiments are stated as a combination of a series of actions. However, a person skilled in the art is to learn that this application is not limited to the described action sequence, because according to this application, some steps may be performed in another sequence.

Figure 11:
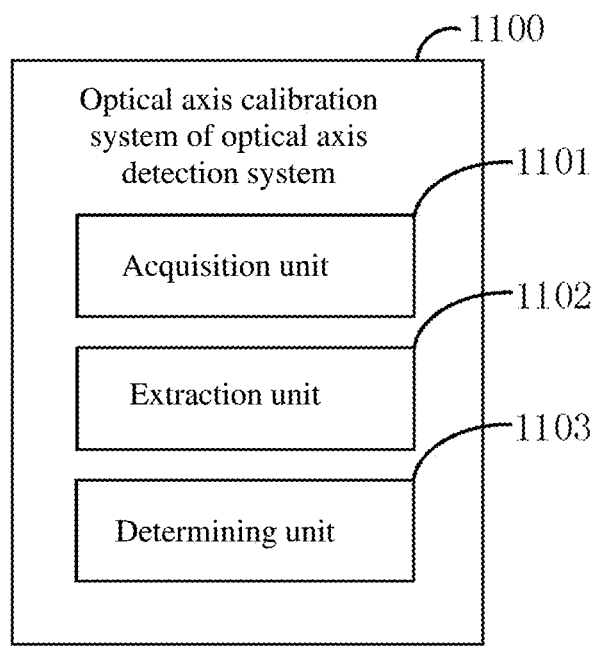
FIG. 11 is a schematic structural diagram of an optical axis calibration apparatus of an optical axis detection system, according to an embodiment of this application.

FIG. 11 is a schematic structural diagram of an optical axis calibration apparatus 1100, according to an embodiment of this application. The optical axis calibration apparatus 1100 is configured on a terminal.

The optical axis calibration apparatus 1100 may include: an acquisition unit 1101, an extraction unit 1102, and a determining unit 1103.

The acquisition unit 1101 is configured to acquire a first speckle image and a second speckle image, where the first speckle image and the second speckle image are images obtained by capturing a speckle pattern projected on a projection screen by a speckle emission device, where the first speckle image is an image captured before the speckle emission device is rotated on a reference plane, and the second speckle image is an image captured after the speckle emission device is rotated on the reference plane.

The extraction unit 1102 is configured to extract at least two first speckle points in the first speckle image and second speckle points in the second speckle image corresponding to the first speckle points, to obtain at least two line segments formed by lines connecting the first speckle points and the second speckle points corresponding to the first speckle points in the same image coordinate system.

The determining unit 1103 is configured to calculate a perpendicular bisector of each of the line segments, and determine an optical axis reference point according to an intersection point of the perpendicular bisectors, where the optical axis reference point is a falling point of an optical axis of the speckle emission device in the projection screen.

In some implementations of this application, a number of the first speckle points is greater than or equal to three. Correspondingly, the extraction unit 1102 may be further configured to: determine whether the first speckle points are all collinear; and when the first speckle points are all collinear, reacquire new first speckle points until the new first speckle points include at least three first speckle points that are not collinear, and extract second speckle points in the second speckle image corresponding to the at least three first speckle points.

In some implementations of this application, there are a plurality of intersection points of the perpendicular bisectors. Correspondingly, the determining unit 1103 may be further configured to: calculate mean value coordinates of the intersection points of the perpendicular bisectors, and use a point at which the mean value coordinates are located as the optical axis reference point.

In some implementations of this application, there are a plurality of intersection points of the perpendicular bisectors. Correspondingly, the determining unit 1103 may be further configured to: fit the intersection points of the perpendicular bisectors into a straight line by using a least square method, and calculate the optical axis reference point according to the fitted straight line.

In some implementations of this application, the number of the first speckle points is equal to two. Correspondingly, the determining unit 1103 may be further configured to: calculate the perpendicular bisector of each of the line segments, and determine whether the perpendicular bisectors are the same line; and when the perpendicular bisectors are the same line, reacquire new first speckle points and second speckle points corresponding to the new first speckle points, and determine the optical axis reference point according to the intersection point of the perpendicular bisectors until the perpendicular bisectors are not the same line.

In some implementations of this application, the speckle emission device is rotated on the reference plane by an angle of any degree other than 0 degrees, 360 degrees, and an integer multiple of 360 degrees.

It should be noted that, for ease and simplicity of description, for a work process of the optical axis calibration apparatus 1100, reference may be made to the corresponding process in the method described in FIG. 1 to FIG. 10, and details are not repeated herein.

Referring to FIG. 1 or FIG. 10, this application further provides an optical axis detection system. The system includes a speckle emission device, a projection screen, a camera, and the optical axis calibration apparatus shown in FIG. 11.

The speckle emission device is configured to project a speckle pattern on the projection screen.

The camera is configured to capture a first speckle image and a second speckle image, where the first speckle image and the second speckle image are images obtained by capturing a speckle pattern projected on a projection screen by a speckle emission device, where the first speckle image is an image captured before the speckle emission device is rotated on a reference plane, and the second speckle image is an image captured after the speckle emission device is rotated on the reference plane.

The optical axis calibration apparatus is configured to acquire the first speckle image and the second speckle image, extract at least two first speckle points in the first speckle image and second speckle points in the second speckle image corresponding to the first speckle points, to obtain at least two line segments formed by lines connecting the first speckle points and the second speckle points corresponding to the first speckle points in the same image coordinate system, calculate a perpendicular bisector of each of the line segments, and determine an optical axis reference point according to an intersection point of the perpendicular bisectors. The optical axis reference point is a falling point of an optical axis of the speckle emission device in the projection screen.

The optical axis detection system may be configured to detect the optical axis of the speckle emission device, or may be configured for optical axis detection of other optical fields with stable features.

Figure 12:
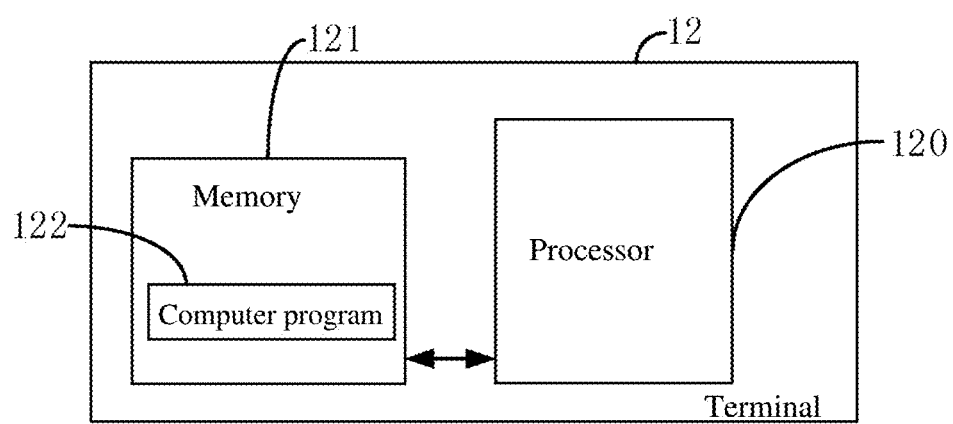
FIG. 12 is a schematic structural diagram of a terminal, according to an embodiment of this application.

FIG. 12 is a schematic diagram of a terminal, according to an embodiment of this application. The terminal 12 may include: a processor 120, a memory 121, and a computer program 122 stored in the memory 121 and executable on the processor 120, such as an optical axis calibration program. Steps in the above optical axis calibration method embodiments, such as steps S401 to S403 shown in FIG. 4, are implemented when the processor 120 executes the computer program 122. Alternatively, functions of the modules/units in the above apparatus embodiments, such as the acquisition unit 1101, the extraction unit 1102, and the determining unit 1103 shown in FIG. 11, are implemented when the processor 120 executes the computer program 122.

The computer program may be divided into one or more modules/units, and the one or more modules/units are stored in the memory 121 and executed by the processor 120, to complete this application. The one or more modules/units may be a series of computer program instruction segments that can complete functions. The instruction segments are used to describe an execution process of the computer program in the terminal.

For example, the computer program may be divided into: an acquisition unit, an extraction unit, and a determining unit. The functions of the units are as below. The acquisition unit is configured to acquire a first speckle image and a second speckle image, where the first speckle image and the second speckle image are images obtained by capturing a speckle pattern projected on a projection screen by a speckle emission device, where the first speckle image is an image captured before the speckle emission device is rotated on a reference plane, and the second speckle image is an image captured after the speckle emission device is rotated on the reference plane. The extraction unit is configured to extract at least two first speckle points in the first speckle image and second speckle points in the second speckle image corresponding to the at least two first speckle points, to obtain at least two line segments formed by lines connecting the first speckle points and the second speckle points corresponding to the first speckle points in the same image coordinate system. The determining unit is configured to calculate a perpendicular bisector of each of the at least two line segments, and determine an optical axis reference point according to an intersection point of the perpendicular bisectors, where the optical axis reference point is a falling point of an optical axis of the speckle emission device in the projection screen.

The terminal may include, but is not limited to, a processor 120 and a memory 121. A person skilled in the art may understand that FIG. 12 is merely an example of the terminal, and does not constitute a limitation to the terminal, and the terminal may include more or fewer components than those shown in the figure, or some components may be combined, or different components may be used. For example, the terminal may further include an input/output device, a network access device, a bus, and the like.

The processor 120 may be a central processing unit (CPU), or may be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

The memory 121 may be an internal storage unit of the terminal, such as a hard disk or an internal memory of the terminal. The memory 121 may be alternatively an external storage device of the terminal, for example, a removable hard disk, a smart media card (SMC), a secure digital (SD) card, or a flash card equipped on the terminal. Further, the memory 121 may further include an internal storage unit of the terminal and an external storage device. The memory 121 is configured to store the computer program and another program and data that are required by the terminal. The memory 121 may be further configured to temporarily store data that is outputted or to be outputted.

In addition, functional units in the embodiments of this application may be integrated into one processing unit, or each of the units may exist alone physically, or two or more units may be integrated into one unit. The integrated unit may be implemented in the form of hardware, or may be implemented in the form of a software functional unit.

When the integrated module/unit is implemented in the form of a software functional unit and sold or used as an independent product, the integrated unit may be stored in a computer-readable storage medium. Based on such understanding, in this application, all or some of the processes of the method in the embodiments may be implemented by a computer program instructing relevant hardware. The computer program may be stored in a computer-readable storage medium. During execution of the computer program by the processor, the steps of the foregoing method embodiments can be implemented. The computer program includes computer program code. The computer program code may be in source code form, object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, or the like. It should be noted that, the content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

The foregoing embodiments are merely for describing the technical solutions of this application, but not for limiting this application. Although this application is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the spirit and the scope of the technical solutions in the embodiments of this application, and shall fall within the protection scope of this application.

What is claimed is:

1. A method for calibrating an optical axis, comprising:
acquiring a first speckle image and a second speckle image, wherein the first speckle image and the second speckle image are obtained by capturing a speckle pattern projected on a projection screen by a speckle emission device, the first speckle image is captured before the speckle emission device is rotated on a reference plane, and the second speckle image is captured after the speckle emission device is rotated on the reference plane;
extracting at least two first speckle points in the first speckle image and second speckle points in the second speckle image corresponding to the at least two first speckle points, to obtain at least two line segments connecting the at least two first speckle points and the second speckle points corresponding to the at least two first speckle points in a same image coordinate system; and
calculating a perpendicular bisector of each of the at least two line segments, and determining an optical axis reference point according to an intersection point of the perpendicular bisectors, wherein the optical axis reference point is a falling point of an optical axis of the speckle emission device on the projection screen.

2. The method according to claim 1, wherein
a number of the at least two first speckle points is greater than or equal to three; and
the extracting second speckle points in the second speckle image corresponding to the three or more first speckle points comprises:
determining whether the three or more first speckle points are collinear; and
in response to determining that the three or more first speckle points are collinear, acquiring new first speckle points of the first speckle image, determining whether at least three first speckle points of the new first speckle points are not collinear, and in response to determining that the at least three first speckle points are not collinear, extracting second speckle points in the second speckle image corresponding to the at least three first speckle points.

3. The method according to claim 2, wherein
the perpendicular bisectors intersect with each other to form a plurality of intersection points; and
the determining an optical axis reference point according to an intersection point of the perpendicular bisectors comprises:
calculating mean value coordinates of the intersection points of the perpendicular bisectors, and determining a point corresponding to the mean value coordinates as the optical axis reference point.

4. The method according to claim 2, wherein
the perpendicular bisectors intersect with each other to form a plurality of intersection points; and
the determining an optical axis reference point according to an intersection point of the perpendicular bisectors further comprises:
fitting the intersection points of the perpendicular bisectors into a straight line by using a least square method, and calculating the optical axis reference point according to the fitted straight line.

5. The method according to claim 1, wherein
a number of the at least two first speckle points is equal to two; and
the calculating a perpendicular bisector of each of the at least two line segments, and determining an optical axis reference point according to an intersection point of the perpendicular bisectors comprises:
calculating the perpendicular bisector of each of the at least two line segments, and determining whether the perpendicular bisectors are a same line; and
in response to determining that the perpendicular bisectors are the same line, acquiring new first speckle points on the first speckle image and new second speckle points on the second speckle image corresponding to the new first speckle points, obtaining at least two new line segments connecting the new first speckle points and the new second speckle points in the same image coordinate system, calculating a new perpendicular bisector of each of the at least two new line segments, and determining whether the new perpendicular bisectors are not the same line, and in response to determining that the new perpendicular bisectors are not the same line, determining the optical axis reference point according to a new intersection point of the new perpendicular bisectors.

6. The method according to claim 1, wherein the speckle emission device is rotated on the reference plane by an angle having a degree that is not 360 multiplied by an integer.

7. A terminal, comprising a memory, a processor, and a computer program stored in the memory and executable on the processor, wherein the processor, when executing the computer program, performs operations comprising:
acquiring a first speckle image and a second speckle image, wherein the first speckle image and the second speckle image are obtained by capturing a speckle pattern projected on a projection screen by a speckle emission device, the first speckle image is captured before the speckle emission device is rotated on a reference plane, and the second speckle image is captured after the speckle emission device is rotated on the reference plane;
extracting at least two first speckle points in the first speckle image and second speckle points in the second speckle image corresponding to the at least two first speckle points, to obtain at least two line segments connecting the at least two first speckle points and the second speckle points corresponding to the at least two first speckle points in a same image coordinate system; and
calculating a perpendicular bisector of each of the at least two line segments, and determining an optical axis reference point according to an intersection point of the perpendicular bisectors, wherein the optical axis reference point is a falling point of an optical axis of the speckle emission device on the projection screen.

8. The terminal according to claim 7, wherein
a number of the at least two first speckle points is greater than or equal to three; and
the extracting second speckle points in the second speckle image corresponding to the three or more first speckle points comprises:
determining whether the three or more first speckle points are collinear; and
in response to determining that the three or more first speckle points are collinear, acquiring new first speckle points of the first speckle image, determining whether at least three first speckle points of the new first speckle points are not collinear, and in response to determining that the at least three first speckle points are not collinear, extracting second speckle points in the second speckle image corresponding to the at least three first speckle points.

9. The terminal according to claim 8, wherein
the perpendicular bisectors intersect with each other to form a plurality of intersection points; and
the determining an optical axis reference point according to an intersection point of the perpendicular bisectors comprises:
calculating mean value coordinates of the intersection points of the perpendicular bisectors, and determining point corresponding to the mean value coordinates as the optical axis reference point.

10. The terminal according to claim 8, wherein
the perpendicular bisectors intersect with each other to form a plurality of intersection points; and
the determining an optical axis reference point according to an intersection point of the perpendicular bisectors further comprises:
fitting the intersection points of the perpendicular bisectors into a straight line by using a least square method, and calculating the optical axis reference point according to the fitted straight line.

11. The terminal according to claim 7, wherein
a number of the at least two first speckle points is equal to two; and
the calculating a perpendicular bisector of each of the at least two line segments, and determining an optical axis reference point according to an intersection point of the perpendicular bisectors comprises:
calculating the perpendicular bisector of each of the at least two line segments, and determining whether the perpendicular bisectors are a same line; and
in response to determining that the perpendicular bisectors are the same line, acquiring new first speckle points on the first speckle image and new second speckle points on the second speckle image corresponding to the new first speckle points, obtaining at least two new line segments connecting the new first speckle points and the new second speckle points in the same image coordinate system, calculating a new perpendicular bisector of each of the at least two new line segments, and determining whether the new perpendicular bisectors are not the same line, and in response to determining that the new perpendicular bisectors are not the same line, determining the optical axis reference point according to a new intersection point of the new perpendicular bisectors.

12. The terminal according to claim 7, wherein the speckle emission device is rotated on the reference plane by an angle having a degree that is not 360 multiplied by an integer.

13. A non-transitory computer-readable storage medium, storing a computer program, wherein the computer program, when executed by a processor, causes the processor to perform operations comprising:
acquiring a first speckle image and a second speckle image, wherein the first speckle image and the second speckle image are obtained by capturing a speckle pattern projected on a projection screen by a speckle emission device, the first speckle image is captured before the speckle emission device is rotated on a reference plane, and the second speckle image is captured after the speckle emission device is rotated on the reference plane;
extracting at least two first speckle points in the first speckle image and second speckle points in the second speckle image corresponding to the at least two first speckle points, to obtain at least two line segments connecting the at least two first speckle points and the second speckle points corresponding to the at least two first speckle points in a same image coordinate system; and
calculating a perpendicular bisector of each of the at least two line segments, and determining an optical axis reference point according to an intersection point of the perpendicular bisectors, wherein the optical axis reference point is a falling point of an optical axis of the speckle emission device on the projection screen.

14. The medium according to claim 13, wherein
a number of the at least two first speckle points is greater than or equal to three; and
the extracting second speckle points in the second speckle image corresponding to the three or more first speckle points comprises:
determining whether the three or more first speckle points are collinear; and
in response to determining that the three or more first speckle points are collinear, acquiring new first speckle points of the first speckle image, determining whether at least three first speckle points of the new first speckle points are not collinear, and in response to determining that the at least three first speckle points are not collinear, extracting second speckle points in the second speckle image corresponding to the at least three first speckle points.

15. The medium according to claim 14, wherein
the perpendicular bisectors intersect with each other to form a plurality of intersection points; and
the determining an optical axis reference point according to an intersection point of the perpendicular bisectors comprises:
calculating mean value coordinates of the intersection points of the perpendicular bisectors, and determining point corresponding to the mean value coordinates as the optical axis reference point.

16. The medium according to claim 14, wherein
the perpendicular bisectors intersect with each other to form a plurality of intersection points; and
the determining an optical axis reference point according to an intersection point of the perpendicular bisectors further comprises:
fitting the intersection points of the perpendicular bisectors into a straight line by using a least square method, and calculating the optical axis reference point according to the fitted straight line.

17. The medium according to claim 13, wherein
a number of the at least two first speckle points is equal to two; and
the calculating a perpendicular bisector of each of the at least two line segments, and determining an optical axis reference point according to an intersection point of the perpendicular bisectors comprises:
calculating the perpendicular bisector of each of the at least two line segments, and determining whether the perpendicular bisectors are a same line; and
in response to determining that the perpendicular bisectors are the same line, acquiring new first speckle points on the first speckle image and new second speckle points on the second speckle image corresponding to the new first speckle points, obtaining at least two new line segments connecting the new first speckle points and the new second speckle points in the same image coordinate system, calculating a new perpendicular bisector of each of the at least two new line segments, and determining whether the new perpendicular bisectors are not the same line, and in response to determining that the new perpendicular bisectors are not the same line, determining the optical axis reference point according to a new intersection point of the new perpendicular bisectors.

18. The medium according to claim 13, wherein the speckle emission device is rotated on the reference plane by an angle having a degree that is not 360 multiplied by an integer.

* * * * *